US 8,548,627 B2

(12) United States Patent
Ulmer et al.

(10) Patent No.: US 8,548,627 B2
(45) Date of Patent: Oct. 1, 2013

(54) METHOD AND SYSTEM FOR AUTOMATICALLY ORGANIZING AND ACHIEVING A PRE-GIVEN TASK BY MEANS OF ROBOT FUNCTIONALITIES

(75) Inventors: Cedric Ulmer, Nice (FR); Laurent Gomez, Le Cannet (FR); Frederic Montagut, Antibes (FR); Cedric Hebert, Mouans Sartoux (FR); Konrad Wrona, Nice (FR)

(73) Assignee: SAP AG, Walldorf (DE)

( * ) Notice: Subject to any disclaimer, the term of this patent is extended or adjusted under 35 U.S.C. 154(b) by 1222 days.

(21) Appl. No.: 11/634,361

(22) Filed: Dec. 5, 2006

(65) Prior Publication Data

US 2007/0129847 A1    Jun. 7, 2007

(30) Foreign Application Priority Data

Dec. 7, 2005   (EP) .................................... 05292602

(51) Int. Cl.
G05B 19/04       (2006.01)
(52) U.S. Cl.
USPC ........... 700/246; 700/245; 700/247; 700/248; 700/249
(58) Field of Classification Search
USPC ....................... 700/245–249, 250, 257; 901/1
See application file for complete search history.

(56) References Cited

U.S. PATENT DOCUMENTS

| | | | | |
|---|---|---|---|---|
| 5,825,981 | A * | 10/1998 | Matsuda | 700/248 |
| 6,330,493 | B1 * | 12/2001 | Takahashi et al. | 700/245 |
| 7,584,121 | B1 * | 9/2009 | Sameshima et al. | 705/26 |
| 2003/0212472 | A1 * | 11/2003 | McKee | 700/245 |
| 2004/0199290 | A1 * | 10/2004 | Stoddard et al. | 700/248 |
| 2005/0080514 | A1 * | 4/2005 | Omote et al. | 700/253 |
| 2006/0064693 | A1 * | 3/2006 | Messer et al. | 718/100 |

FOREIGN PATENT DOCUMENTS

EP     1795983 B1    6/2007

OTHER PUBLICATIONS

"Official Action for EP Application No. EP 05292602.9", (Mar. 23, 2007).
Ha, Young-Guk, et al., "Service-Oriented Integration of Networked Robots with Ubiquitous Sensors and Devices Using the Semantic Web Services Technology", *Intelligent Robots and Systems*, 2005. (*IROS 2005*), (Aug. 2, 2005).
EP Search Report for Application No. 05292602, (May 11, 2006), 4 pages.
Agarwal, V., et al., "A Service Creation Environment based on End to End Composition of Web Services", Proceedings of the 14th International World Wide Web Conference, (May 11, 2005), 128-137.

(Continued)

*Primary Examiner* — James Trammell
*Assistant Examiner* — Jerrah Edwards
(74) *Attorney, Agent, or Firm* — Brake Hughes Bellermann LLP

(57) ABSTRACT

Systems and methods for automatically organizing and achieving a pre-given task by means of plurality of robots, each robot having a robot specific set of functionalities, are described. In an example implementation, a method can include the following steps: providing and exposing, for each robot, a semantic description of the robot's robot specific functionalities by respective semantic web services; providing a semantic description of the pre-given task; matching the semantically described task with the semantic web services describing the robot specific functionalities; and combining automatically a coordinated set of the plurality of robots according to the matching result, such that the task is achieved when the robots are sequentially working upon invocation.

12 Claims, 2 Drawing Sheets

(56) References Cited

OTHER PUBLICATIONS

De Rivera, G. G., et al., "A Generic Software Platform for Controlling Collaborative Robotic System using XML-RPC", Proceedings of the 2005 IEEE/ASME International Conference on Advanced Intelligent Mechatronics, (Jul. 24, 2005), 1336-1341.

Maenpaa, T., et al., "A Distributed Architecture for Executing Complex Tasks with Multiple Robots", Proceedings of the 2004 IEEE ICRA, vol. 4, (Apr. 26, 2004), 3449-3455.

Response to Article 96 (2) Communication for EP Application No. 05292602.9, mailed Jun. 12, 2007, 11 pages.

Communication under Rule 71 (3) for EP Application No. 05292602.9, mailed May 27, 2009, 4 pages.

Response to Communication under Rule 71(3) for EP Application No. 05292602.9, mailed Jul. 9, 2009, 6 pages.

Response to Written Opinion EP Application No. 05292602.9, mailed Aug. 2, 2006, 4 pages.

Decision to Grant a European Patent for EP Application No. 05292602.9, mailed Aug. 6, 2009, 2 pages.

\* cited by examiner

METHOD AND SYSTEM FOR AUTOMATICALLY ORGANIZING AND ACHIEVING A PRE-GIVEN TASK BY MEANS OF ROBOT FUNCTIONALITIES

CROSS-REFERENCE TO RELATED APPLICATION

This application claims priority under 35 U.S.C. §119 to European Patent Application EP 05292602.9, filed Dec. 7, 2005, entitled "A METHOD AND A SYSTEM FOR AUTOMATICALLY ORGANIZING AND ACHIEVING A PRE-GIVEN TASK BY MEANS OF ROBOT FUNCTIONALITIES," which is incorporated herein by reference in its entirety.

TECHNICAL FIELD

This description relates to a method and a system for automatically organizing and achieving a pre-given task by means of robot functionalities, particularly by means of a plurality of robots, each robot having a robot specific set of functionalities.

BACKGROUND

Currently, many robots exist that can fulfill tasks based on their available functionalities. Robots are taking on more importance in industries as technology evolves. The robot industry is progressively being adopted in companies in order to accomplish complex tasks, and robots are becoming more autonomous and complex in their functionalities. For example, robots can find their own way from one point to another, or pick up goods and transport them. However, one single robot is generally restricted to a certain set of functionalities, thus, reducing the scope of the task it can achieve. A robot specialized in moving heavy goods may not be equipped with a mechanical arm, preventing it from being able to pick up goods from a shelf. That means that robots still remain specialized and can only accomplish a defined set of tasks. Combining robots in order to achieve more complex tasks is sometimes done in automotive industries, for example, where assembly robots are sequentially followed by painting robots, in order to help building cars. Still, this robot assembly is achieved manually, and requires programmatic efforts. In order to achieve tasks that a single robot cannot accomplish alone there are no tools at the moment that allow for the automatic composition of functionalities of different robots. Thus, either a task is not fulfilled, or a new robot is built, or the composition of a plurality of robots is done manually by human beings. No solution exists yet that proposes to assemble robot functionalities automatically, apart for engineers that sit around a table and spend time designing and programming new applications in order to combine robots. Yet, this approach is not flexible, and it is restricted to the robots it has been designed for.

In the meantime, research in the area of web service composition has progressed. Research prototypes are now able to compose services automatically in order to accomplish a desired task such as answering a certain request. Provided that a developer semantically describes the preconditions and the goal of a task, and provided that web services available are also semantically described, a computer can automatically set up a composite service that can fulfill the task. A so-called expert system can be based on such an automatic service composition.

SUMMARY

Example implementations allow for intelligent robots assembly which allows for fulfilling a pre-given task by automatically combining robot functionalities and robots, respectively, based on their respective robot functionalities.

Example implementations include a method for automatically organizing and achieving a pre-given task by means of a plurality of robots and a method for automatically organizing and achieving a pre-given task by means of a plurality of robot functionalities.

For example, a method for automatically organizing and achieving a pre-given task by means of a plurality of robots can be provided, in which each robot has a robot specific set of functionalities. The method can include the steps of: providing and exposing, for each robot, a semantic description of the robot's robot specific functionalities by respective semantic web services; providing a semantic description of the pre-given task; matching the semantically described task with the semantic web services describing the robot specific functionalities; and combining automatically a coordinated set of the plurality of robots according to the matching result, such that the task is achieved when the robots are sequentially working upon invocation.

According to an implementation, it is possible that the step of combining the set of robots further includes a step of deriving a workflow from the matching result and of generating the coordinated set of robots according to that workflow. Such a workflow can clearly reflect the working steps that must be sequentially performed in order to achieve the pre-given task. Thus, the workflow also can reflect the order according to which the different robots of the coordinated set of robots have to be employed.

According to another implementation of this method, the step of combining the set of robots can further include a step of providing at least one coordination service that allows a handoff from one robot to another of the coordinated set of robots and of inserting that coordination service whenever such a handoff is to be performed so that the robots are enabled to work sequentially and seamlessly together upon invocation. It is possible that the at least one coordination service is specifically composed depending on the handoff to be performed.

The robots within the coordinated set of robots can communicate with each other such that a coordinated cooperation among the robots of the coordinated set of robots can be realized. It is possible that the robots of the coordinated set of robots are connected via wireless connection and communication means.

According to a further implementation of this method, the semantic web services describing the respective robot specific functionalities each can be accessible via a specific URL (Uniform Resource Locator).

Furthermore, it is possible that the semantic web services describing the robot functionalities are each provided with an appropriate linkage, linking them to at least one of the corresponding robots of the plurality of robots, respectively. That means that a robot can be automatically invoked upon a web service call of the semantic web service linked to that robot describing its robot specific functionalities. By means of this method the idea of automatic web services composition can be adapted to the robotic world. With the help of this method it is possible to combine automatically robot specific functionalities of different robots in order to achieve tasks that a single robot could not have achieved by itself.

This method can be applied to any type of robot for any type of tasks. For a better understanding, the method will be explained in the following by an example that is restricted to a set of two robots with a pre-given task. In the example, in a warehouse that possesses two robots with limited robot functionalities, the following task may need to be accomplished: picking up an asset on a specific shelf located at location X and bringing it to an exit E of the warehouse. Both robots are assumed to be connected by a wireless connection and communication system. For both robots, their respective robot specific functionalities can be semantically described and exposed by semantic web services. Each of those web services describing the respective robot specific functionalities can be accessible via a specific URL. The pre-given task relating to a handling of goods may be analyzed to derive therefrom a semantic description of the pre-given task. By means of the semantic description of the pre-given task it is possible to match the semantic description of the pre-given task with the semantic web-services describing the respective robot specific functionalities. The pre-given task can be semantically described by an appropriate succession of semantic web services. In the above-mentioned case, the following succession of semantic web services that can fulfill the pre-given task, can be described as follows: moving to a shelf located at a location, X; picking up the asset located on the shelf located at location X; and transporting the asset autonomously from the location X to an Exit, E.

Although each of the mentioned semantic web services is bound to a corresponding robot, the cooperation of the robots can be achieved by combining the robots into a coordinated set of robots with respect to their robot specific functionalities. First, each of the above-mentioned semantic web services can be provided with an appropriate linkage, linking them to one of the corresponding robots, respectively. That means, that each service can include in a descriptor a description to which robot it belongs. Second, if a semantic web service follows a previous one, but if the two semantic web services both belong to a different robot or are assigned to a different robot, a further service, namely, an already-mentioned coordination service, can be added or inserted which makes both robots get in touch in order to pass one to the other the asset to be moved. The proposed coordination service can allow a robot to hand over the asset to a next robot. This can be achieved, for example, by combining a first service that moves robots next to each other with a second service that hands over the asset from one robot to the other. In the present example, it is possible that for this coordination service, each robot declares an attribute that is a so-called "PickUpZone," that is a location where a robot can handle an asset. In the case of a robot with a robot arm, the so-called PickUpZone can be anywhere within the range of the mechanical robot arm. In the case of a robot without handling capabilities, the PickUpZone can correspond to a place the asset has to be dropped in order for that robot to be able to carry it.

Generally, it is possible for the coordination service to be configured to allow a first robot of the coordinated set of robots to handover an asset to be transported to a second robot of the coordinated set of robots, with the second robot sequentially following the first robot within the coordinated set of robots.

It is possible that the coordination service is a combination of a first service allowing robots to move next to each other and a second service allowing a handover of an asset from one robot to another robot.

According to another implementation of this method, the robots can be automatically invoked by calling the semantic web services describing the respective robot specific functionalities. Pre-given tasks semantically described can be first matched with available semantic web services that in turn each describe robot specific functionalities of respective robots. The matching result can be exposed in the form of a succession of some of those semantic web services. Furthermore, it is possible that the semantic web services are each provided with a direct linkage, linking them to the corresponding robots, respectively. Therefore, in order to achieve the pre-given task, the semantic web services that match with the semantic description of the pre-given task can be sequentially called, and the calling can invoke automatically the respective robots linked to the called semantic web services. It is possible that the succession of semantic web services is called at once via one single service call. Thus, a combination of web services compositions and the robotic world can be provided.

As described above services can be composed automatically to accomplish a desired task. Provided that a developer semantically describes the preconditions and the goal of the task, and provided that the web services available are also semantically described, a computer can automatically setup a composite service that can fulfill the task. With the techniques described herein such a service composition can be linked to a coordinated set of robots whose specific robot functionalities are semantically described by and linked to respective semantic web services. Thus, specific robot functionalities can be combined automatically to achieve a pre-given task that a single robot could not have achieved by itself.

Implementations further relate to methods for automatically organizing and achieving a pre-given task by means of a plurality of robot functionalities. For example, a method can include the steps of: providing and exposing a semantic description of the robot specific functionalities by respective semantic web services; providing a semantic description of the pre-given task; matching the semantic described task with the semantic web services describing the robot specific functionalities; and combining hence automatically a coordinated set of the plurality of robot functionalities according to the matching result, such that the task is achieved when the robot functionalities are sequentially employed upon invocation.

In some implementations, the plurality of robot functionalities can be incorporated within one single robot.

Implementations also provide a system for automatically organizing and achieving a pre-given task by means of a number of robots. For example, a system can include the number of robots, where each robot has a robot specific set of functionalities, an access to a repository of semantic web services, at least one component configured to provide and expose for each robot a semantic description of its robot specific functionalities by respective semantic web services of that repository, at least one component configured to provide a semantic description of the pre-given task input via an input unit, matching logic to match the semantically described task with the semantic web services describing the robot specific functionalities, combining logic to automatically combine hence a coordinated set of robot functionalities of the number of robots according to a matching result provided by the matching logic, such that the task can be achieved when the robot functionalities are sequentially employed upon invocation and controlling means configured to control the number of robots.

In one implementation, the system further includes a component configured to derive a workflow from a matching result, where robot functionalities are combined to a coordinated set of robot functionalities according to the workflow.

The coordinated set of robot functionalities can be assigned to a coordinated set of robots. Thus, the task can be achieved when the robots of the coordinated set of robots are sequentially working upon invocation.

In a further implementation, the system can include a coordinating component configured to provide at least one coordination service that allows a handoff from one robot to another robot of the coordinated set of robots and to insert that coordination service whenever such a handoff is to be performed so that the robots are enabled to work sequentially and seamlessly together upon invocation.

It is possible that the system further comprises coupling logic configured to link the semantic web services of the repository describing the robot specific functionalities to the corresponding robots via appropriate linkages.

The robots also can communicate with each other via a wireless connection and communication system.

Furthermore, the coordinated set of robots can be invoked via respective service calling. Thus, the robots can be automatically invoked via calling the respective semantic web services of the repository describing the robot specific functionalities using appropriate provided linkages.

Therefore, a task that can be described by a succession of semantic web services of the repository can be fulfilled when calling that succession of semantic web services. It is possible to call that succession of semantic web services simultaneously.

The present invention also refers to a computer program product having a computer-readable medium and a computer program and/or program code stored on the computer-readable medium with a program code which is suitable for carrying out one or more of the techniques described herein when the computer program is run on a computer.

It will be understood that the features mentioned above and those described hereinafter can be used not only in the combination specified but also in other combinations or on their own.

The details of one or more implementations are set forth in the accompanying drawings and the description below. Other features will be apparent from the description and drawings, and from the claims.

DETAILED DESCRIPTION

Figure 1:
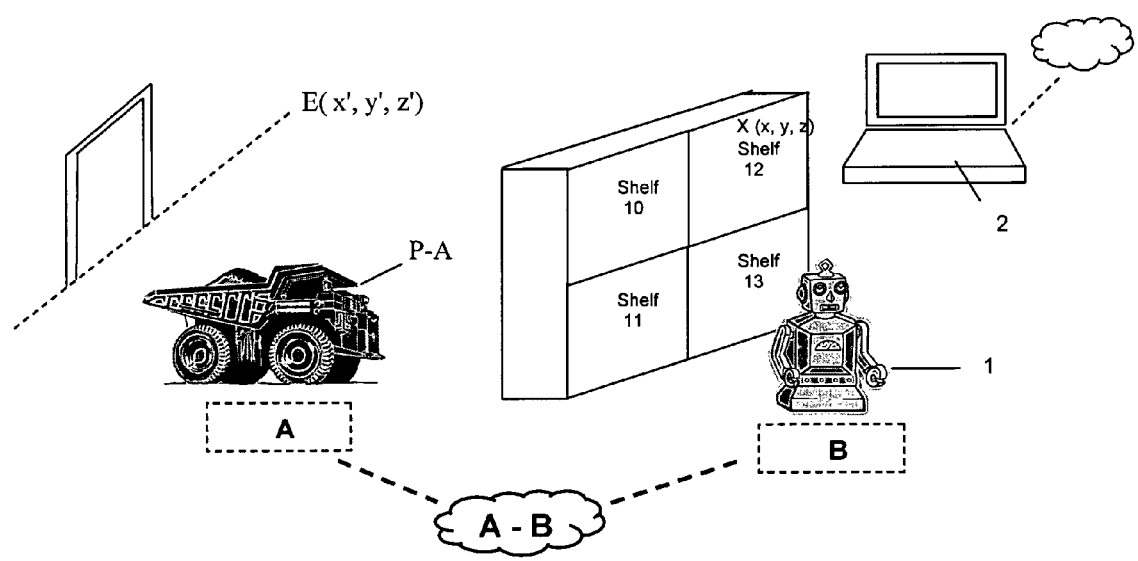
FIG. 1 is a schematic block diagram of a system for automatically organizing and achieving a pre-given task with a robot functionalities.

FIG. 1 shows a system 1 that includes a robot A and a robot B. Robot A and robot B both have robot specific functionalities that can be employed within a warehouse. FIG. 1 further shows a set of shelves, namely shelf 10, shelf 11, shelf 12, and shelf 13, as part of the warehouse. In such a warehouse one of the plurality of tasks that can be accomplished by the two robots, robot A and robot B, can be exemplarily formulated as follows:

Pick up an asset on shelf 12, and
Bring the asset to an exit E of the warehouse.

Both robots, robot A and robot B, can be connected via a wireless connection and communication system, indicated by the cloud 20. Robot A has a set of robot specific functionalities specific for robot A, and robot B has a set of robot functionalities specific for robot B. The set of robot specific functionalities of robot A as well as the set of robot specific functionalities of robot B both can be semantically described by appropriate semantic web services. The set of robot functionalities specific for robot A and the set of robot functionalities specific for robot B both can be exposed by the corresponding semantic web services. Those semantic web services can be accessible, for example, via a specific URL on the World Wide Web that is schematically illustrated as cloud 30. The semantic web services describing the robot specific functionalities of robot A can be provided with a linkage that links those semantic web services to robot A. The semantic web services describing the robot specific functionalities of robot B can be provided with an appropriate linkage that links those semantic web services to robot B. Thus, a web service call of one of the semantic web services describing robot specific functionalities of robot A automatically invokes robot A due to the linkage included by the respective semantic web services. This also applies to the semantic web services describing the robot specific functionalities of robot B.

To achieve the above-mentioned task, namely to pick up an asset on shelf 12 and to bring it to the exit E of the warehouse, robot A and robot B have to cooperate with respect to their corresponding robot specific functionalities. The system can provide an access to a repository of semantic web services useable to describe the robot specific functionalities of robot A and robot B, respectively. This access can be realized via a computer 2. Robot A is able to transport an asset autonomously from a first place to a second place. This robot functionality can be described by a corresponding semantic web service, namely by a service to transport an asset autonomously from a first place to a second place. Robot B is able to move to a shelf of a certain number located at a certain location and to pick up an asset located on that certain shelf. The number of the shelf can be pre-given by the user. This functionality is also describable by an appropriate semantic web service. Second, a succession of semantic web services can be found that can fulfill the above-mentioned task. A succession of semantic web services fulfilling the above mentioned task can be described as follows:

Move to shelf number 12 at position X(x,y,z);
Pick-up an asset located on shelf at position X(x,y,z); and
Transport the asset autonomously from X(x,y,z) to Exit E(x',y',z').

That means that the shelf number 12 from which an asset should be picked-up and transported to the exit E of the warehouse can be described by a vector X with the coordinates (x,y,z). The exit E of the warehouse to which the asset is to be transported can be described by a vector E with the coordinates (x',y',z'). This succession of semantic web services can be matched with the semantic web services describing the robot specific functionalities of robot A and robot B. The semantic web services describing the robot specific functionalities of robot A and robot B can be described as follows. The robot functionality of robot A can be described as follows:

Transport asset autonomously from Y(x",y",z") to W(x''', y''',z'''):
hasPrecondition: coord asset=coord robot,
hasInput: coord asset=Y(x",y",z"),
hasOutput: coord asset=W(x''',y''',z'''),
hasResult: asset moved to W
URL: http://<serviceURL>
Executing_robot: A This semantic web service clearly describes the robot functionality of robot A and includes a linkage linking the semantic web service to robot A. The service linked to robot A describes the possibility to transport an asset autonomously from a freely choosable place Y(x",y",z") to a choosable place W(x''',y''',z'''). The places Y and W can be located within a limited area, for example, within the area of the above mentioned warehouse. The transport service can only be executed by robot A when the coordinates of the asset to be transported are equal to the coordinates of robot A, which is formulated as a precondition of the transport service. For executing the transport service, the coordinates of the asset to be transported (e.g., Y(x",y",z")) should be pre-given as input. The output is given by the coordinates of the place to which the asset is to be transported, namely W(x''',y''',z''').

The result of the transport service is the movement of the asset from its origin, namely Y(x",y",z"), to a destination location, namely W(x''',y''',z'''). The service can be called via an appropriate URL. The transport service can be executed by robot A.

Robot B can have two robot specific functionalities, namely to move to a shelf of a certain number at a location X(x,y,z) and to pick up an asset located on that shelf. Both robot functionalities can be described by an appropriate semantic service, respectively.

The semantic web service to move to a shelf of a certain number at the location X(x,y,z) can be described as follows:
   Move to shelf number X(x,y,z):
   hasInput: X(x,y,z),
   hasOutput: coord robot=X(x,y,z)
   URL:http://<serviceURL>
   executing_robot:B The second robot functionality can be described by a further semantic web service, namely by a pick up service which can be described as follows:
   Pick up asset located on shelf number X(x,y,z):
   hasInput:asset identifier+X(x,y,z),
   hasOutput: coord asset=coord robot,
   hasResult: asset picked by robot
   URL:http://<serviceURL>
   executing_Robot:B The move service can have as an input value a vector X with coordinates (x,y,z) describing the location where the robot executing this service has to move. The move service can have as an output value that the coordinates of the executing robot are equal to the coordinates of the desired shelf number. The move service also has a linkage linking that service to an executing robot, namely to robot B.

The pick up service has as an input value an asset identifier and the location of the shelf number where the asset is located. The output value of the pick up service is that the coordinates of the asset to be picked up are equal to the coordinates of the executing robot. The result of the pick up service is described by picking up the asset by the executing robot. The pick up service is also linked to the executing robot, namely to robot B.

The above described semantic web services describing the robot specific functionalities of robot A and robot B, respectively, are at first independent from each other. In order to achieve a pre-given task those semantic web services can be combined such that the robots able to execute the respective semantic web services can cooperate sequentially. To realize the coordination and the cooperation of robot A and robot B a supplement service can be added, which makes both robots, robot A and robot B, get in touch with each other such that the asset to be moved is passed from one robot to the other.

When matching the above mentioned succession of semantic web services that can fulfill the pre-given task, namely to move to shelf number X(x,y,z), to pick up an asset located on shelf number X(x,y,z) and to transport that asset autonomously from X(x,y,z) to Exit E (x',y',z'), with the described semantic web services describing the robot specific functionalities of robot A and robot B, respectively, the semantic web services and the corresponding robots have to be identified.

Furthermore, a service, namely a coordination service, that makes robot A and robot B get in touch can be inserted. In the present case, namely in handling goods, the coordination service can allow robot A to hand over the asset to robot B. This can be achieved, for example, by combining a service that moves robot A and robot B next to each other with a further service that hands over the asset from robot A to robot B. For this coordination service, each robot, namely robot A and robot B, can declare an attribute which is a so-called PickUpZone. The PickUpZone is a location where a robot can handle an asset. In the case of robot B, this can be anywhere within the range of its mechanical arm. In the case of robot A, which does not possess handling capabilities, the PickUpZone P-A can correspond to a place the asset has to be dropped so that robot A is enabled to carry it. In the illustrated case, the PickUpZone P-A of robot A would be the carriage zone. The order of the semantic web services, including the additional coordination service can therefore be described as follows:
   move to shelf number X(x,y,z), which is performed by robot B,
   pick up an asset located on a shelf number X(x,y,z), which is also performed by robot B
   move autonomously to X(x,y,z),which is performed by robot A,
   drop asset on the PickUpZone P-A of robot A, which can be described by J(x+α, Y+β, z+γ), which is performed by robot B,
   transport asset autonomously from X(x,y,z) to Exit E (x', y',z'), which is performed by robot A.

Based on the semantic description of the respective robot specific functionalities of robot A and robot B, a succession of semantic web services matching with the semantic description of the pre-given task can allow an automatic composition of the robots fulfilling the pre-given task that could not be achieved by a single robot.

Figure 2:
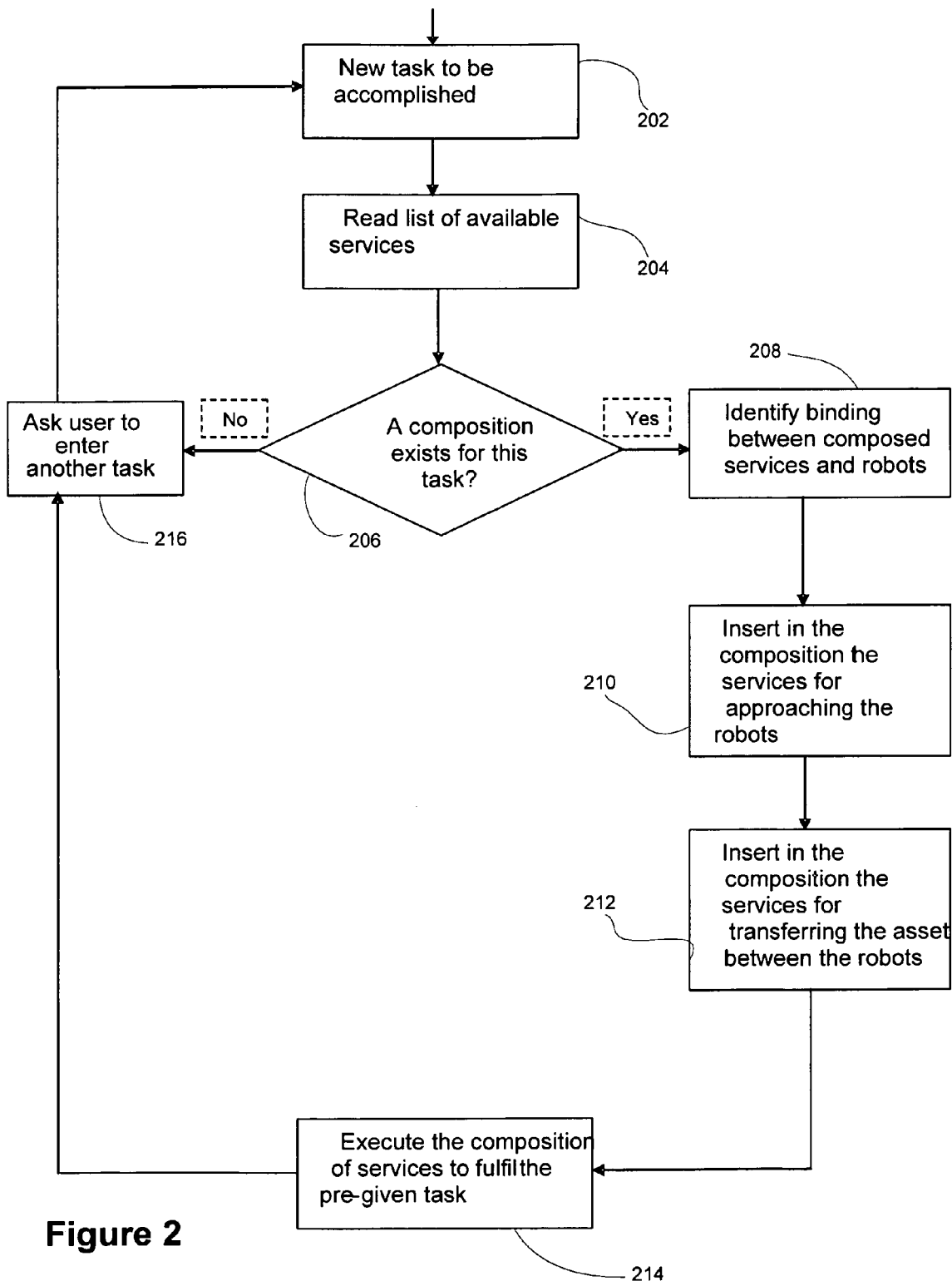
FIG. 2 shows a flow chart a method for automatically organizing and achieving a pre-given task with a robot functionalities.

FIG. 2 shows schematically a generic flow chart of a process that combines robot specific functionalities to fulfill a pre-given task. In step 202 a new task that is to be accomplished is pre-given. With respect to that pre-given task a list of available semantic web services is read in step 204. In step 206 it is analyzed whether a composition of semantic web services fulfilling the pre-given task already exists. In case that such a composition of semantic web services exists the single semantic web services of that composition are identified. For each of those services the respective linkage of the service to one or more robots is identified in step 208. That means that a coordinated set of robots can be combined by means of which the succession of the semantic web services can be executed. To coordinate the cooperation of the robots, one or more appropriate coordination services can be inserted. In the case described with respect to FIG. 1, namely in handling goods, such a coordination service can be composed by two services, namely by a first service for approaching the robots and a second service for transferring an asset between the respective robots. After those appropriate coordination services have been inserted in step 210 and 212, the composition of the semantic web services can now be executed in step 214 by means of the coordinated set of robots, thus fulfilling the pre-given task. The execution of the composition of the semantic web services can be triggered automatically via an appropriate web service call.

Each semantic web service can be linked to an appropriate robot whose robot specific functionalities are adapted to execute that semantic web service. When calling such a semantic web service via a web service call, for example via an appropriate URL, the corresponding robot linked to that service can be activated automatically. The cooperation of different robots can be realized by inserting the above-mentioned coordination services coordinating the respective robot functionalities of the different robots.

In step 216 the user can be asked to enter a new task. If no composition of available semantic web services exists in step 206, the user can also be asked to enter another task.

What is claimed is:

1. A method for automatically organizing and achieving a task with a plurality of robots, each robot having a robot specific set of functionalities, the method comprising:
   receiving, via at least one processor, a semantic description of the task from a computer;
   accessing, via the at least one processor, a repository of semantic web services storing, for each robot, a semantic description of the robot's robot-specific functionalities and a link from each semantic web service to a corresponding robot configured to execute the respective semantic web service using the robot-specific functionalities;
   matching, via the at least one processor, the semantic description of the task with at least two semantic web services of the repository including matching a first semantic web service describing the robot-specific functionalities of a first robot and a second semantic web service describing the robot-specific functionalities of a second robot that relate to the semantic description of the task;
   combining automatically, via the at least one processor, a coordinated set of at least the first robot and the second robot according to the matching by deriving a workflow from the matching and generating the coordinated set of robots according to that workflow, such that the task is achieved when the first and second robots are sequentially working upon invocation;
   inserting, via the at least one processor, at least one coordination service when the first semantic web service follows the second semantic web service, and the first semantic web service and the second web service are assigned to different robots, the at least one coordination service including additional robot-specific functionalities for at least one of the first robot and the second robot to coordinate a handoff of an asset from the second robot to the first robot such that the first and second robots are enabled to work sequentially and seamlessly together upon invocation; and
   invoking, via the at least one processor, the first and second robots to perform the task according to the derived workflow and the inserted coordination service by activating the links corresponding to the first semantic web service and the second semantic web service.

2. The method of claim 1, wherein the at least one coordination service is specifically composed depending on the handoff to be performed.

3. The method of claim 1, wherein the first and second robots of the coordinated set of robots are connected via a wireless connection.

4. The method of claim 1, wherein the semantic web services describing the respective robot specific functionalities are each accessible via a specific URL.

5. The method of claim 1, wherein the task relates to a handling of goods.

6. The method of claim 5, wherein the at least one coordination service is configured to allow the second robot of the coordinated set of robots to hand over the asset to be transported to the first second robot of the coordinated set of robots, the first robot sequentially following the second robot within the coordinated set of robots.

7. The method of claim 6, wherein the at least one coordination service is a combination of a first service allowing the first and second robots to move next to each other and a second service allowing the handover of the asset from the second robot to the first robot.

8. The method of claim 1, wherein the invoking, via the at least one processor, the first and second robots to perform the task according to the derived workflow and the inserted coordination service includes calling the first and second semantic web services.

9. A system for automatically organizing and achieving a task with a plurality of robots, each robot having a robot specific set of functionalities, the system comprising:
   at least one processor;
   a non-transitory computer-readable storage medium including instructions executable by the at least one processor, the instructions configured to implement,
   at least one component configured to receive a semantic description of the task from a computer;
   the at least one component configured to access a repository of semantic web services storing, for each robot, a semantic description of the robot's robot-specific functionalities and a link form each semantic web service to a corresponding robot configured to execute the respective web service using the robot-specific functionalties;
   matching logic configured to match the semantic description of the task with at least two semantic web services of the repository including matching a first semantic web service describing the robot-specific functionalities of a first robot and a second semantic web service describing the robot-specific functionalities of a second robot that relate to the semantic description of the task;
   combining logic configured to combine automatically a coordinated set of at least the first robot and the second robot according to a matching result provided by the matching logic by deriving a workflow from the matching result and generating the coordinated set of robots according to that workflow, such that the task can be achieved when the first and second robots are sequentially employed upon invocation;
   coordinating logic configured to insert at least one coordination service when the first semantic web service follows the second semantic web service, and the first semantic web service and the second semantic web service are assigned to different robots, the at least one coordination service including additional robot-specific functionalities for at least one of the first robot and the second robot to coordinate a handoff of an asset from the second robot to the first robot such that the first and second robots are enabled to work sequentially and seamlessly together upon invocation; and
   a controller configured to invoke the first and second robots to perform the task according to the derived workflow and the inserted coordination service by activating the links corresponding to the first semantic web service and the second semantic web service.

10. The system of claim 9, wherein the first and second robots are configured to communicate with each other via a wireless connection.

11. The system of claim 9, wherein the controller configured to invoke the first and second robots includes calling at least one service call.

12. A non-transitory computer-readable medium storing instructions that when executed cause at least one processor to automatically organize and achieve a task using a plurality of robots, each robot having a robot specific set of functionalities, the instructions comprising instructions to:
  receive a semantic description of the task from a computer;
  access a repository of semantic web services storing, for each robot, a semantic description of the robot's robot-specific functionalities and a link from each semantic web service to a corresponding robot configured to execute the respective semantic web service using the robot-specific functionalities;
  match the semantic description of the task with at least two semantic web services of the repository including matching a first semantic web service describing the robot-specific functionalities of a first robot and a second semantic web service describing the robot-specific functionalities of a second robot that relate to the semantic description of the task;
  automatically combine automatically a coordinated set of at least the first robot and the second robot according to the matching by deriving a workflow from the matching and generating the coordinated set of robots according to that workflow, such that the task is achieved when the first and second robots are sequentially working upon invocation;
  insert at least one coordination service when the first semantic web service follows the second semantic web service, and the first semantic web service and the second web service are assigned to different robots, the at least one coordination service including additional robot-specific functionalities for at least one of the first robot and the second robot to coordinate a handoff of an asset from the second robot to the first robot such that the first and second robots are enabled to work sequentially and seamlessly together upon invocation; and
  invoke the first and second robots to perform the task according to the derived workflow and the inserted coordination service by activating the links corresponding to the first semantic web service and the second semantic web service.

* * * * *